United States Patent [19]

Cardinale et al.

[11] 4,335,906
[45] Jun. 22, 1982

[54] WELDABLE JOINT

[75] Inventors: Paul J. Cardinale, Auburn; Leonard E. Partelow, Jr., Lyons, both of N.Y.

[73] Assignee: Parker-Hannifin Corporation, Cleveland, Ohio

[21] Appl. No.: 55,114

[22] Filed: Jul. 5, 1979

[51] Int. Cl.³ .............................................. F16L 13/02
[52] U.S. Cl. ...................................... 285/22; 285/286; 228/246; 219/60R
[58] Field of Search ......................... 228/50, 189, 246; 285/21, 22, 286, DIG. 7, 287, 417, 383; 219/60 R, 61, 160

[56] References Cited

U.S. PATENT DOCUMENTS

| 385,384 | 7/1888 | Thomson | 285/DIG. 7 |
|---|---|---|---|
| 1,218,621 | 3/1917 | Blumenthal | 285/383 |
| 1,442,834 | 1/1923 | Steigerwuld | 219/61 |
| 1,453,343 | 5/1923 | Fay | 285/22 X |
| 1,643,227 | 9/1927 | Stresau | 285/22 X |
| 2,003,488 | 6/1935 | Hook | 285/287 |
| 2,366,579 | 1/1945 | Von Ahrens | 285/22 |
| 2,996,600 | 8/1961 | Gardner et al. | 219/61 |
| 3,024,045 | 6/1962 | Cleminshaw et al. | 285/21 |
| 3,033,145 | 5/1962 | Thielsch | 228/246 |
| 3,709,529 | 1/1973 | Mains | 285/286 |
| 3,805,011 | 4/1974 | Knaefel | 219/61 X |
| 3,949,186 | 4/1976 | Nakayama et al. | 219/121 EM |
| 4,134,606 | 1/1979 | Menti | 285/21 |

Primary Examiner—Dave W. Arola
Attorney, Agent, or Firm—James A. Baker

[57] ABSTRACT

A fuel injection nozzle assembly includes a nozzle housing 11, an inlet connector 12 welded to the housing 11 at a weld joint 14, and a nozzle 15 welded to the housing 11 at a weld joint 16. The weld joint 14, prior to welding, includes a cap 25 having an annular radially outermost crest 26 radially aligned with the joint to be welded. Cap 25 also includes peripheral surfaces 27 and 28 extending axially from the crest 26 in opposite directions and extending radially inwardly from the crest 26 at a slope. The slope is sufficiently steep that an electrical arc 32 between an electrode 31 and the cap 25 will remain on the crest 26 and will not move down the peripheral surfaces 27 and 28 even if the electrode 31 is not precisely aligned with the crest 26.

16 Claims, 6 Drawing Figures

U.S. Patent   Jun. 22, 1982   4,335,906
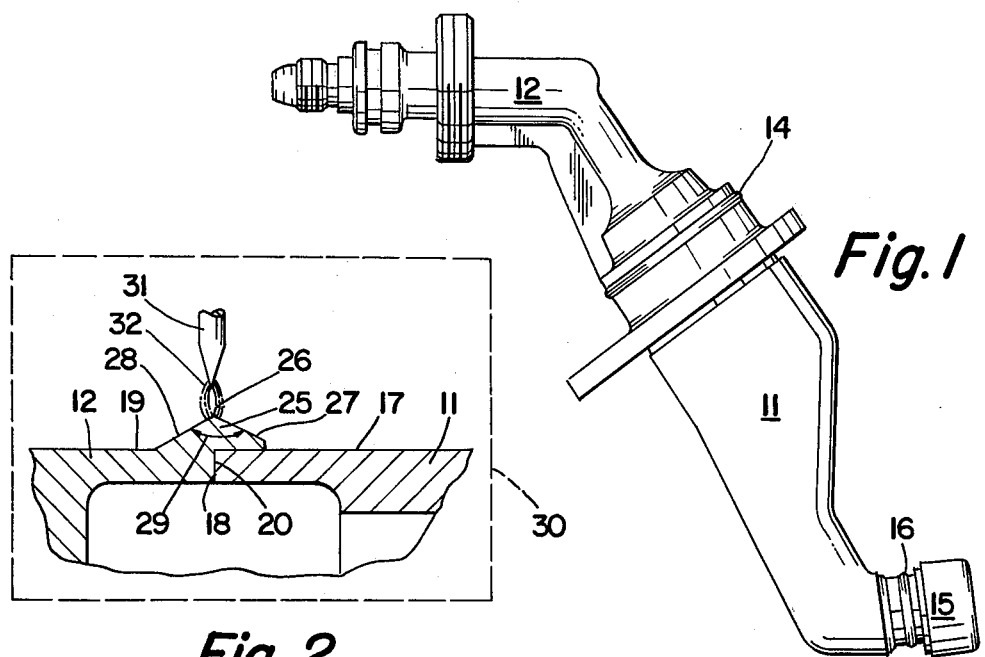
Fig. 1
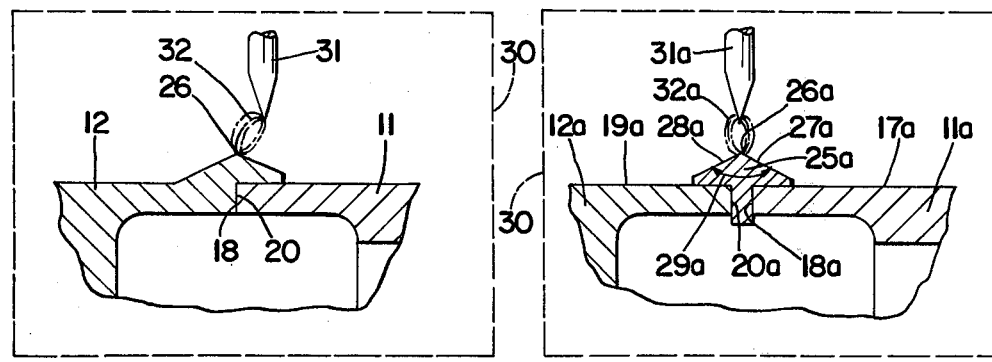
Fig. 2
Fig. 3
Fig. 5
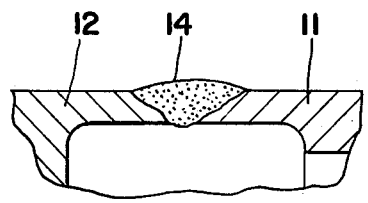
Fig. 4
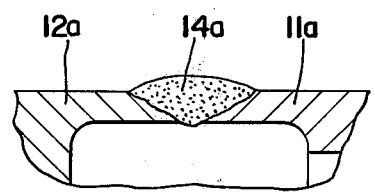
Fig. 6

WELDABLE JOINT

BACKGROUND OF THE INVENTION

The present invention relates to a weldable joint for use with automatic welding machines such as automatic tungsten inert gas welders. More particularly, the invention relates to such a weldable joint that directs the welding arc to a location that is properly aligned with the joint even if the source of the arc is misaligned with the joint.

Abutting metallic parts are frequently welded together using well-known automatic welding machines such as automatic tungsten inert gas welders. When automatic welding machines of this type are used, erosion of the tip of the electrode can cause the electrical arc to contact the parts at one side of the joint instead of in precise alignment with the joint. This misalignment of the electrical arc relative to the joint can also be caused by out-gassing of the welded material, by lack of eccentricity of the clamp that holds the parts that are to be welded, and by other well-known factors. This misalignment of the electrical arc relative to the location of the weld joint can cause a concentration of heat on one side of the weld joint and a lack of adequate heat on the other side of the weld joint, resulting in incomplete weld penetration of the parts.

SUMMARY OF THE INVENTION

The present invention departs from the prior art and overcomes the aforementioned problems by providing a weldable joint which includes first and second cylindrical metallic members. The first and second members have aligned cylindrical outer surfaces which terminate at axially facing end surfaces. The axially facing end surfaces define a circumferential joint that is to be welded.

An annular metallic cap is disposed radially outward of the axially facing end surfaces and encircles the joint. The cap has an annular radially outermost crest that is radially aligned with the joint. The cap also has first and second peripheral surfaces which extend axially in opposite directions from the crest and which extend radially inwardly from the crest. The peripheral surfaces define an included angle of about 90° to about 150° inclusive, and preferably of about 130°.

By this arrangement, the invention provides a sharp crest or peak, and the resistance to the flow of energy from the electrode to the crest is less than the resistance to the flow of energy from the electrode to any other part of the cap. This permits the electrode to be radially misaligned relative to the crest and joint, while still assuring that the electrical arc will contact the cap at the crest location in precise radial alignment with the joint that is to be welded.

BRIEF DESCRIPTION OF THE DRAWINGS

These and other aspects and advantages of the invention are more fully explained below with reference to the accompanying drawings, wherein:

FIG. 1 is a side elevational view of a fuel injection nozzle assembly which utilizes a weldable joint according to the principles of the invention;

FIG. 2 is an enlarged cross-sectional side elevational view of a portion of the fuel injection nozzle shown in FIG. 1 prior to welding of the joint, with the electrode properly aligned with the joint;

FIG. 3 is a view similar to FIG. 2 but with the electrode misaligned relative to the joint;

FIG. 4 is a view similar to FIGS. 2 and 3 after the weld has been completed;

FIG. 5 is an enlarged cross-sectional side elevational view of an alternate embodiment of the invention; and FIG. 6 is a view similar to FIG. 5 after the weld has been completed.

DETAILED DESCRIPTION OF THE DRAWINGS

Referring now to the drawings in greater detail, FIG. 1 shows a fuel injection nozzle assembly for use in a gas turbine engine. The nozzle assembly includes a nozzle housing 11, a fuel inlet connector 12 welded to the housing 11 at a weld joint 14, and a nozzle 15 welded to the housing 11 at a weld joint 16. The housing 11 may contain a flow divider or variable area valve (not shown) such as the valve shown in U.S. Pat. No. 3,022,954. The nozzle 15 may be a dual orifice nozzle of the type shown in U.S. Pat. No. 3,024,045.

Referring now to FIG. 2, the structure of the weld joint 14 prior to the welding operation is shown. The housing 11 includes a cylindrical outer peripheral surface 17 which terminates at an axially facing end surface 18. Similarly, the inlet connector 12 includes a cylindrical outer peripheral surface 19 which terminates at an axially facing end surface 20. The end surfaces 18 and 20 cooperatively define a joint that is to be welded to attach the housing 11 and inlet connector 12 together. In the preferred embodiment, the diameter of the cylindrical surfaces 17 and 19 is about 1½ inches, and the nominal wall thickness of the housing 11 and inlet connector 12 adjacent the welded joint is about ⅛ inch.

The material for the portions of the housing 11 and inlet connector 12 which are welded together is preferably an AMS 5362 stainless steel casting. Alternatively, this material may be an AMS 5754 stainless steel casting or any other suitable material.

The weldable joint shown in FIG. 2 further includes an annular metallic cap 25. The cap 25 includes a sharp annular radially outermost crest 26 which is radially aligned with the joint defined by the end surfaces 18 and 20. The crest 26 has a radius of less than 0.125 inches, and in the preferred embodiment the radius of the crest 26 is not greater than 0.015 inches. The cap 25 also includes first and second peripheral surfaces 27 and 28 extending axially from the crest 26 in opposite directions and extending radially inwardly from the crest 26 toward the cylindrical surfaces 17 and 19. In the embodiment shown in FIG. 2, the cap 25 is integral with the inlet connector 12.

Still referring to FIG. 2, the contour of each peripheral surface 27 and 28 in an axial plane taken through the center line of the housing 11 and connector 12 is a straight line, and these straight lines define an included angle 29. In order to obtain the proper locational orientation of the electrical arc relative to the joint defined between the surfaces 18 and 20, the included angle 29 should be not less than about 90° and not greater than about 150°. In the preferred embodiment, the included angle 29 is 130°.

When the weldable joint shown in FIG. 2 is to be welded, the housing 11 and inlet connector 12 are clamped in a suitable fixture (not shown) in a well-known tungsten inert gas automatic welder 30. An electrode 31 of the welder 30 is positioned in radially outward alignment with the joint defined by the surfaces 18 and 20. The interior and exterior of the housing 11 and inlet connector 12 are purged with a suitable inert gas, and an electrical arc 32 passes between the tip of the electrode 31 and the cap 25. Because the resistance to the flow of energy from the electrode 31 to the cap 25 is less at the location of the crest 26 than at any other location on the cap 25, and because the crest 26 is disposed in precise radially outward alignment with the joint defined between the end surfaces 18 and 20, the electrical arc 32 is in precise alignment with the joint. In the preferred embodiment, the arc voltage between the electrode 31 and the cap 25 is maintained at about 7.7 volts.

The housing 11 and inlet connector 12 are then rotated relative to the stationary electrode 31 to complete the weld about the entire circumference of the housing 11 and inlet connector 12. In the preferred embodiment, the speed of rotation is about 1.2 revolutions per minute. As this occurs, the tip of the electrode 31 may become misaligned with the joint defined between the end surfaces 18 and 20. This can be caused by erosion of the electrode 31, by out-gassing of the welded materials, or by other well-known factors. This condition in which the electrode 31 is misaligned with the joint between the surfaces 18 and 20 is illustrated in FIG. 3. Prior to applicant's invention, this misalignment could cause a concentration of heat on one side of the joint and insufficient heat on the other side of the joint, resulting in incomplete weld penetration at the location of the joint. With the present invention, however, the electrical arc 32 remains between the electrode 31 and the crest 26 so that the electrical arc 32 remains in precise radial alignment with the joint. After the welding is completed, the cap 25 and housing 11 and connector 12 are melted together to form the welded joint 14, as illustrated in FIG. 4.

In order for the invention to perform satisfactorily, the slope of the peripheral surfaces 27 and 28 from the crest 26 should be sufficiently great that the arc voltage between the electrode 31 and the crest 26 remains substantially constant when the tip of the electrode 31 wanders 0.025 inches to either side from the center of the joint. If the slope of the peripheral surfaces 27 and 28 does not meet this requirement, the automatic welder 30 will respond to the changed arc voltage and will move the electrode 31 radially in a well-known manner. This could cause the electrical arc to move away from the crest 26 and could result in a concentration of heat on one side of the joint resulting in incomplete weld penetration.

Experimentation with the present invention has shown the presence of still other advantages of the invention. One of these advantages is that the crest 26 provides a visual guide for permitting the operator to align the electrode 31 with the joint between the surfaces 18 and 20 even though the operator cannot see the joint itself after the housing 11 and inlet connector 12 are initially clamped in the automatic welder. Another advantage is that the increased precision resulting from the invention permits a relatively narrow welding band to achieve complete weld penetration of the parts being welded. This permits the use of lower arc voltages and smaller spacings between the electrode 31 and the joint, resulting in a decreased tendency for the welded materials to sag into the interior of the housing 11 and inlet connector 12.

After the fuel injection nozzle assembly shown in FIG. 1 has been in use in a gas turbine engine for a period of time, it may be desirable to rebuild the nozzle assembly. To accomplish this, the weld 14 is cut with an appropriate cutting tool (not shown) to permit separating the housing 11 and inlet connector 12. The weld 16 is cut in a similar manner to permit separation of the housing 11 and nozzle 15. This is described in greater detail in U.S. Pat. No. 3,709,529. The appropriate rebuilding procedures are then performed on the housing 11 and inlet connector 12 and nozzle 15 and their associated components, and these parts are then rewelded.

The rewelding of the joint 14 is accomplished using the weldable joint shown in FIG. 5. In the joint shown in FIG. 5, the portions which correspond to those illustrated in FIGS. 2 through 4 are indicated by the same reference numeral but with the suffix a. The housing 11a and inlet connector 12a are identical to the housing 11 and inlet connector 12, with the exception that the axial end surfaces 18a and 20a are spaced apart by an axial width due to the cutting described above of the welded joint 14. In the embodiment shown in FIG. 5 the integral cap 25 shown in FIGS. 2 and 3 is replaced with a separate cap 25a. The cap 25a is preferably machined from the same base material as used for the housing 11a and connector 12a. The cap 25a includes a stem portion which extends between and is in engaging contact with the surfaces 18a and 20a. The cap 25a also includes a cap portion having a crest 26a and straight peripheral surfaces 27a and 28a. The axial extent of the surfaces 27a and 28a of the cap portion is greater than the axial width between the surfaces 18a and 20a. The welding of the housing 11a and connector 12a is then performed in the same manner as described above in connection with FIGS. 2 through 4, and the resulting weld 14a is illustrated in FIG. 6.

What is claimed is:

1. A device comprising first and second metallic cylindrical members having a preweld configuration and a postweld configuration; in said preweld configuration said members having axially facing surfaces defining a circumferential joint to be welded and generally smooth uninterrupted cylindrical surfaces extending axially away from said axially facing surfaces, an annular metallic cap disposed radially outward of said axially facing and cylindrical surfaces and encircling said joint, said cap contacting at least one of said members, said cap having an uninterrupted annular radially outermost crest radially aligned with said joint, said cap having first and second peripheral surfaces extending axially from said crest in opposite directions and extending radially inwardly from said crest toward said cylindrical surfaces at a predetermined slope, and said first and second peripheral surfaces being radially inward of said crest and radially outward of said cylindrical surfaces at all locations; in said postweld configuration substantially the entirety of said cap being melted integrally with the portion of said members adjacent said axially facing surfaces to form a welded joint, and said welded joint comprising only materials of said members and said cap.

2. A device as set forth in claim 1, wherein said slope of said peripheral surfaces in an axial plane is discontinuous at the location of said crest in said preweld configuration.

3. A device as set forth in claim 1 wherein said slope of at least one of said peripheral surfaces in an axial plane is substantially constant for substantially the entire axial extent of said one peripheral surface in said preweld configuration.

4. A device as set forth in claim 1 wherein said first and second members are each part of a fuel nozzle assembly in said preweld and postweld configurations.

5. A device comprising first and second metallic cylindrical members, said members having aligned cylindrical outer surfaces terminating at axially facing surfaces, said axially facing surfaces defining a circumferential joint to be welded, an annular metallic cap disposed radially outward of said axially facing and cylindrical surfaces and encircling said joint, said cap contacting at least one of said members, said cap having an uninterrupted annular radially outermost crest radially aligned with said joint, said cap having first and second peripheral surfaces extending axially from said crest in opposite directions and extending radially inwardly from said crest toward said cylindrical members at a predetermined slope, said slope of said peripheral surfaces in an axial plane being discontinuous at the location of said crest, and said peripheral surfaces being radially inward of said crest and radially outward of said cylindrical surfaces at all locations.

6. A device as set forth in claim 5 wherein said slope of each of said peripheral surfaces in an axial plane is substantially constant.

7. A device as set forth in claim 6 wherein the included angle between said peripheral surfaces is between about 90° and about 150° inclusive.

8. A device as set forth in claim 7 wherein said included angle is about 130°.

9. A device comprising first and second metallic cylindrical members, said members having aligned cylindrical outer surfaces terminating at axially facing surfaces, said axially facing surfaces defining a circumferential joint to be welded, an annular metallic cap disposed radially outward of said axially facing and cylindrical surfaces and encircling said joint, said cap contacting at least one of said members, said cap having an uninterrupted annular radially outermost crest radially aligned with said joint, said cap having first and second peripheral surfaces extending axially from said crest in opposite directions and extending radially inwardly from said crest toward said cylindrical members at a predetermined slope, said slope of said peripheral surfaces in an axial plane being discontinuous at the location of said crest, and said slope being sufficiently steep that the arc voltage used to weld said device remains substantially constant when the source of the arc remains a fixed radial distance from said members and said source moves axially 0.025 inches from the center of said joint.

10. A device comprising a first metallic cylindrical member, a second metallic cylindrical member, and an annular metallic cap disposed between said first and second members, said first and second members having axially facing circumferentially extending surfaces and generally smooth uninterrupted cylindrical surfaces extending axially away from said facing surfaces, said cap including an annular stem portion disposed between said facing surfaces and engaging each of said facing surfaces, said cap including an annular top portion disposed radially outwardly of said stem portion and formed integrally with said stem portion, said top portion having an axial extent greater than the axial width between said facing surfaces, said top portion having an uninterrupted annular radially outermost crest radially aligned with said joint, said cap having first and second peripheral surfaces extending axially from said crest in opposite directions and extending radially inwardly toward said cylindrical surfaces at a predetermined slope, said peripheral surfaces being radially inward of said crest and radially outward of said cylindrical surfaces at all locations, and said slope being sufficiently steep that the arc voltage used to weld said device remains substantially constant when the source of the arc remains a fixed radial distance from said members and said source moves axially 0.025 inches from the center of said joint.

11. A device as set forth in claim 10 wherein said first and second members are each part of a fuel nozzle assembly.

12. A device as set forth in claim 10 wherein said slope of said peripheral surfaces in an axial plane is discontinuous at the location of said crest.

13. A device as set forth in claim 10 wherein said slope of each of said first and second peripheral surfaces in an axial plane is substantially constant.

14. A device as set forth in claim 13 wherein said first and second peripheral surfaces define an included angle, and said included angle is between 90° and 150° inclusive.

15. In combination, a weldable device and an automatic welder, said device comprising first and second metallic cylindrical members, said members having aligned cylindrical outer surfaces terminating at axially facing surfaces, said axially facing surfaces defining a circumferential joint to be welded, an annular metallic cap disposed radially outward of said axially facing and cylindrical surfaces and encircling said joint, said cap contacting at least one of said members, said cap having an uninterrupted annular radially outermost crest radially aligned with said joint, said automatic welder comprising electrode means adjacent said crest, an electrical arc having a predetermined arc voltage extending between said electrode means and said crest, and peripheral surface means on said cap confining said electrical arc to said crest, said peripheral surface means including first and second surfaces extending axially from said crest in opposite directions and extending radially inwardly from said crest toward said members at a predetermined slope.

16. In combination, a weldable device and an automatic welder, said device comprising first and second metallic cylindrical members, said members having aligned cylindrical outer surfaces terminating at axially facing surfaces, said axially facing surfaces defining a circumferential joint to be welded, an annular metallic cap disposed radially outward of said axially facing and cylindrical surfaces and encircling said joint, said cap contacting at least one of said members, said cap having an uninterrupted annular radially outermost crest radially aligned with said joint, said automatic welder comprising electrode means adjacent said crest, an electrical arc having a predetermined arc voltage extending between said electrode means and said crest, and peripheral surface means on said cap confining said electrical arc to said crest, said peripheral surface means including first and second surfaces extending axially from said crest in opposite directions and extending radially inwardly from said crest toward said members at a predetermined slope, and said slope being sufficiently steep that the arc voltage used to weld said device remains substantially constant when said electrode remains a fixed radial distance from said members and said source moves axially 0.025 inches from the center of said joint.

* * * * *